United States Patent
Rodriguez

(10) Patent No.: US 9,479,654 B2
(45) Date of Patent: Oct. 25, 2016

(54) DEVICES AND METHODS FOR ADDING SERVICE, AUTHORIZING SERVICE AND/OR ACTIVATING SERVICE FOR A PLURALITY OF WIRELESS DEVICES

(71) Applicant: Tracfone Wireless, Inc., Miami, FL (US)

(72) Inventor: Jesus Rodriguez, Pembroke Pines, FL (US)

(73) Assignee: TracFone Wireless Inc., Miami, FL (US)

(*) Notice: Subject to any disclaimer, the term of this patent is extended or adjusted under 35 U.S.C. 154(b) by 188 days.

(21) Appl. No.: 14/011,281

(22) Filed: Aug. 27, 2013

(65) Prior Publication Data

US 2014/0066016 A1  Mar. 6, 2014

Related U.S. Application Data

(60) Provisional application No. 61/693,994, filed on Aug. 28, 2012.

(51) Int. Cl.
| | |
|---|---|
| H04M 1/66 | (2006.01) |
| H04M 17/00 | (2006.01) |
| H04W 12/06 | (2009.01) |
| H04M 17/02 | (2006.01) |
| H04W 4/00 | (2009.01) |

(52) U.S. Cl.
CPC ............. *H04M 17/30* (2013.01); *H04M 17/02* (2013.01); *H04M 17/103* (2013.01); *H04W 12/06* (2013.01); *H04W 4/00* (2013.01)

(58) Field of Classification Search
CPC .. H04M 17/30; H04M 17/02; H04M 17/103; H04W 4/00; H04W 12/06
USPC ......... 455/411, 406, 410; 703/63; 379/114.2, 379/12.01, 121.03
See application file for complete search history.

(56) References Cited

U.S. PATENT DOCUMENTS

| | | | |
|---|---|---|---|
| 6,654,600 B1* | 11/2003 | Pollak et al. ................. | 455/405 |
| 6,793,135 B1* | 9/2004 | Ryoo ............................ | 235/383 |
| 7,031,693 B2* | 4/2006 | Ohrstrom et al. ............ | 455/406 |
| 2001/0000777 A1* | 5/2001 | McGregor et al. ........... | 455/406 |
| 2002/0151293 A1* | 10/2002 | Tysor ............................ | 455/406 |
| 2004/0011864 A1* | 1/2004 | Thompson et al. .......... | 235/380 |
| 2005/0117566 A1* | 6/2005 | Davidson .............. | H04M 1/725 370/352 |
| 2008/0113646 A1* | 5/2008 | Cereceres et al. ............ | 455/405 |
| 2008/0119161 A1* | 5/2008 | Collart .......................... | 455/408 |
| 2008/0287099 A1* | 11/2008 | Zonana ......................... | 455/408 |
| 2009/0088128 A1* | 4/2009 | Mumford et al. ............ | 455/405 |
| 2010/0042510 A1* | 2/2010 | Zeinfeld et al. ............... | 705/26 |
| 2010/0254522 A1* | 10/2010 | New et al. .................. | 379/93.12 |
| 2012/0314864 A1* | 12/2012 | Ramprasad et al. .......... | 380/270 |

* cited by examiner

*Primary Examiner* — Wayne Cai
(74) *Attorney, Agent, or Firm* — Baker & Hostetler LLP

(57) ABSTRACT

A system and a method for adding, authorizing, or activating pre-paid wireless service for multiple users includes receiving one of a plurality of authorization codes associated with a single transaction, single authorization card, or a single account. The system and method further verifying that the received one of the plurality of authorization codes is authentic. The system and method further adding, authorizing, and/or activating wireless service in response to receiving and verifying the one of the plurality codes. A card, print out, and webpage having a plurality of authorization codes implementing the invention is disclosed as well.

20 Claims, 6 Drawing Sheets

NO BILLS. NO CONTRACTS. NO SURPRISES.

TRACFONE®
THE CELL PHONE THAT PUTS YOU IN CONTROL

WHY TRACFONE ▼    PHONES ▼    AIRTIME ▼    APPS & MORE ▼    SUPPORT ▼

COVERAGE    FIND A STORE    CONTACT    TRACK YOUR ORDER    ESPAÑOL

Search 🔍    👤 MY ACCOUNT

ACTIVATE PHONE    ADD AIRTIME

August 1, 2012

Multiple user airtime card    $XX.00
Tax    $YY.00
Total    $ZZ.00

Access codes 1111-2222-3333-4444 — 2
2111-2222-3333-4444 — 3
3111-2222-3333-4444 — 4
4111-2222-3333-4444 — 5

DEVICES AND METHODS FOR ADDING SERVICE, AUTHORIZING SERVICE AND/OR ACTIVATING SERVICE FOR A PLURALITY OF WIRELESS DEVICES

CROSS REFERENCE TO PRIOR APPLICATIONS

This application claims the benefit from U.S. Provisional Application No. 61/693,994 and filed on Aug. 28, 2012, which is hereby incorporated by reference for all purposes as if fully set forth herein.

BACKGROUND OF THE DISCLOSURE

1. Field of the Invention

The invention relates to devices and methods for adding, authorizing, and/or activating prepaid wireless service for a plurality of wireless devices. More particularly, the invention relates to devices and methods for adding, authorizing, and/or activating prepaid wireless services for a plurality of wireless devices associated with a single account, a single transaction, and/or a single activation card.

2. Background

Wireless service typically takes one of two forms. A first form is postpaid contract-based subscription with a wireless service provider (e.g. "provider"). The user is usually billed on a monthly basis for the service. While a deposit may be required to initiate service, the user pays for the monthly wireless services used at the end of the month, after having already used the wireless services. Thus, credit must be extended to the user so as to allow the provision of services. However, certain users may not want to be burdened by such contract-based wireless service. Some users also do not like unexpected large bills for wireless services used. Accordingly, users may find pre-paid wireless services attractive.

Providers offering pre-paid wireless services allow the user the option of paying for a predetermined amount of wireless services prior to using the service. Thus, the provider is not extending credit to the user, as payment for the services is made in advance. The wireless user is accordingly not surprised by large wireless service bills. Moreover, the user is not burdened and held to a contract that will bind them to the wireless service provider for years.

Typically, a user wishing to purchase pre-paid wireless services from a wireless provider, purchases an authorization code. For example, a card carrying an authorization code. The authorization code corresponds to a credit level. The user may purchase the card from a merchant, from the wireless service provider, or a provider website. The code may also be obtained without a card from the same sources. The authorization codes enables the wireless device for a predetermined time, set amount of airtime, set amount of text messages, set amount of data, a combination thereof, and/or the like. If the user desires to provide wireless service for multiple users, the user must purchase additional cards or obtain additional authorization codes from a merchant, a wireless provider website, or the like in order to provide wireless service for each of these multiple users.

There is, however, no convenient way to provide pre-paid wireless service for multiple users. Therefore, there is a need for a convenient and efficient process and system for authorizing the use of multiple pre-paid wireless devices.

SUMMARY OF THE INVENTION

In accordance with the invention, devices and methods for authorizing wireless service for a plurality users is provided.

The devices provide a convenient and efficient way to provide multiple authorization codes to a wireless user.

In one aspect a system for adding, authorizing, or activating pre-paid wireless service for multiple users includes a server configured to receive one of a plurality of authorization codes associated with one of a single transaction, single authorization card, and a single account, the server further configured to verify that the received one of the plurality of authorization codes is authentic, and the server further configured to at least one of add, authorize, and activate wireless service for a wireless device in response to receiving and verifying the received one of the plurality codes.

The server may be configured to receive one of a plurality of authorization codes associated with the single transaction, wherein the single transaction comprises one of a retail transaction and web-based transaction. The single transaction comprises the retail transaction and the retail transaction results in generation of the plurality of authorization codes. The single transaction includes the web-based transaction and the web-based transaction a result in generation of the plurality of authorization codes. The system may include a web server configured to provide a first web page to a user including at least an interface for entering information, the web server further configured to provide an interface on said first web page for purchasing wireless service for multiple wireless device users, the web server configured to receive a request with for the purchase of wireless service, the request including financial transaction data for purchasing wireless service, and the web server configured to transmit a plurality of authorization codes in response to the purchase of wireless service by employing a second web page including the plurality of authorization codes corresponding to the wireless service purchased. The server may be configured to receive one of a plurality of authorization codes associated with the single authorization card, wherein the single authorization card comprises a plurality of authorization codes. The server may be configured to receive one of a plurality of authorization codes associated with the single account. The wireless device may include an accounting module. The accounting module may track wireless service including remaining available wireless service.

Another aspect, a method for adding, authorizing, or activating pre-paid wireless service for multiple users includes receiving one of a plurality of authorization codes associated with a single transaction, single authorization card, or a single account, verifying that the received one of the plurality of authorization codes is authentic and at least one of adding, authorizing, and activating wireless service for a wireless device in response to receiving and verifying the one of the plurality codes.

The receiving may include receiving one of a plurality of authorization codes associated with the single transaction, wherein the single transaction comprises one of a retail transaction and web-based transaction. The single transaction may include the retail transaction and the retail transaction results in generation of the plurality of authorization codes. The single transaction may be the web-based transaction and the web-based transaction may result in generation of the plurality of authorization codes. The method may include providing a first web page with the server system to a user of the service, the first web page including at least an interface for entering information, providing an interface with the server system on said first web page for purchasing additional airtime for multiple wireless device users, receiving a request with the server system for the purchase of additional wireless service, the request including financial transaction data for purchasing additional airtime, and transmitting with the server system a plurality of authorization codes in response to the purchase of additional wireless service by employing a second web page including the plurality of authorization codes corresponding to the wireless service purchased. The receiving may include receiving one of a plurality of authorization codes associated with the single authorization card, wherein the single authorization card comprises a plurality of authorization codes. The receiving may include receiving one of a plurality of authorization codes associated with the single account. The wireless device may include an accounting module. The accounting module may track wireless service including remaining available wireless service. The foregoing needs are met, to a great extent, by the invention, with a device and process configured to conveniently provide wireless services for multiple users. In particular, the invention is intended to solve the challenges of providing multiple users, such as a family, with wireless services for each of their wireless devices.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

BRIEF DESCRIPTION OF THE DRAWINGS

FIG. 3 shows a web page having multiple wireless authorization codes according to the invention.

DETAILED DESCRIPTION

Reference in this specification to a wireless device is intended to encompass devices such as mobile phones, tablet computers, gaming systems, MP3 players and the like. Reference to a "wireless device" is intended to encompass any compatible mobile technology computing device that connects to a wireless communication network, such as mobile phones, mobile equipment, mobile stations, user equipment, cellular phones, smartphones, handsets or the like (e.g., Apple iPhone, iPad, Google Android based devices, BlackBerry based devices, other types of PDAs or smartphones), wireless dongles, or other mobile computing devices. The term "wireless device" may be interchangeably used and referred to herein as wireless handset, handset, mobile device, device, mobile phones, mobile equipment, mobile station, user equipment, cellular phone, smartphones, or phone.

Wireless devices may connect to a wireless network or network and are intended to encompass any type of wireless network to obtain mobile phone services through the use of a wireless device, such as a Global System for Mobile Communication (GSM) network, Code-Division Multiple Access (CDMA) network or the like, that may utilize the teachings of the present application to allow a wireless device to connect to a wireless network.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Figure 1:
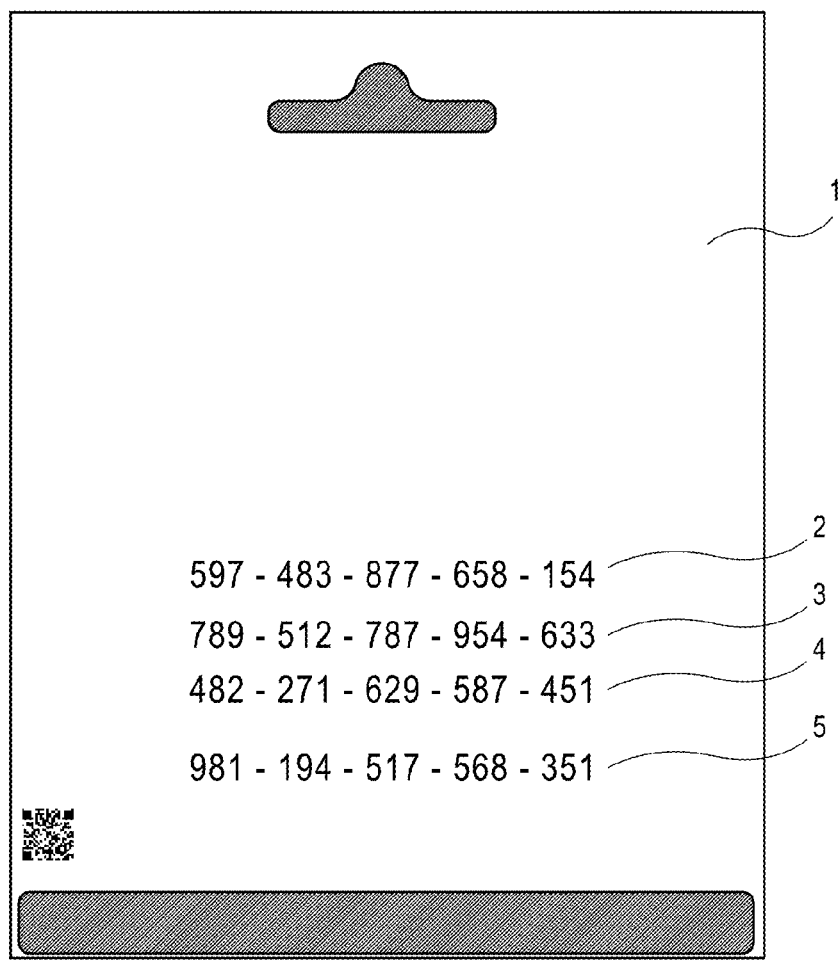
FIG. 1 shows a card having multiple wireless authorization codes according to the invention.

FIG. 1 shows a card having multiple wireless authorization codes according to the invention. In particular, FIG. 1 shows a card 1 having a first wireless authorization code 2, a second wireless code 3, a third wireless code 4, and a fourth wireless code 5. Each of the codes 2, 3, 4, and 5 provide a predetermined amount of wireless service. The predetermined amount of wireless service may include one or more or a combination of wireless services. The wireless services may include wireless airtime, wireless messaging, wireless data, days of service, and/or the like. The aspect of the card 1 shown in FIG. 1 having a particular number of codes is merely exemplary. The card 1 can have any number of the codes 2, 3, 4 and 5. For example, the card 1 may have two, three, four, five, six or more codes. The card 1 may be purchased by the wireless user at a retail establishment, over the telephone, by mail, through a wireless service provider website or the like.

Figure 2:
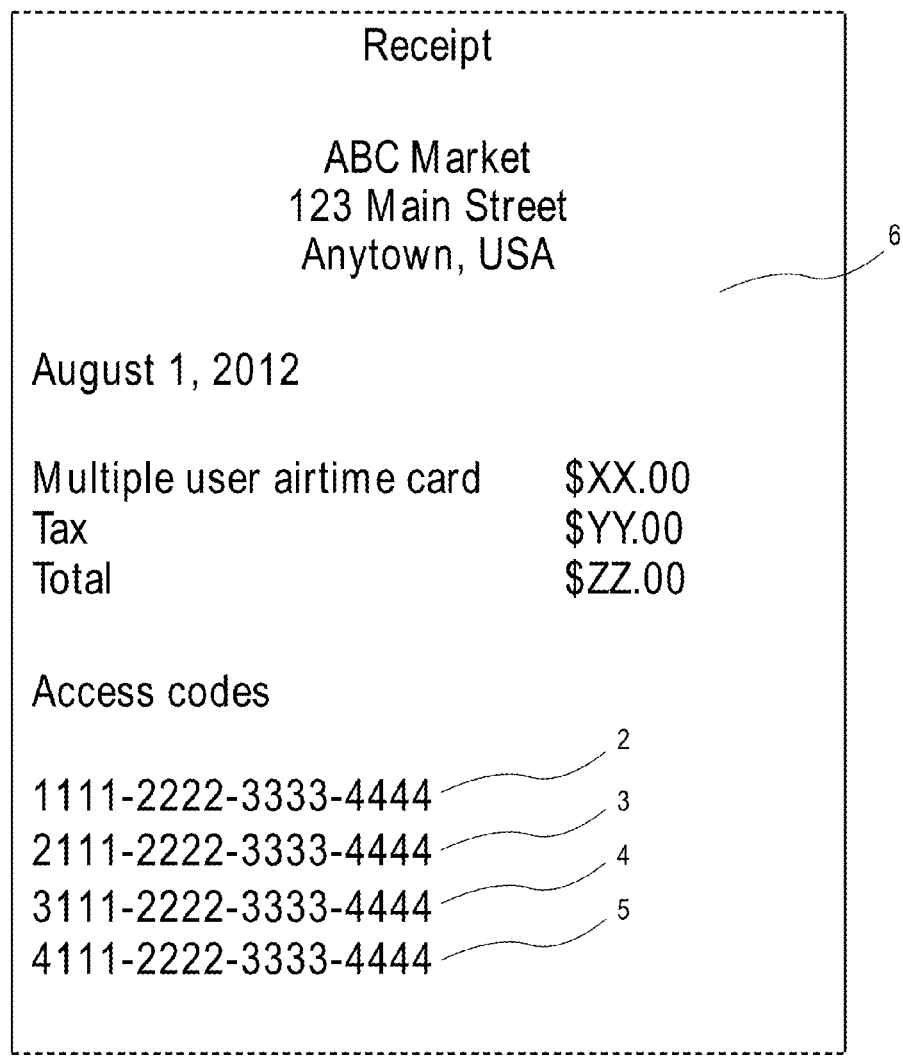
FIG. 2 shows a paper-based printout having multiple wireless authorization codes according to the invention.

FIG. 2 shows a paper-based printout having multiple wireless authorization codes according to the invention. In this regard, the wireless user may purchase the authorization codes in a format that does not utilize the card 1. For example, the wireless user may purchase the authorization codes at a retail establishment, over the telephone, by mail, through a wireless service provider website or the like that results in a paper printout 6 as shown in FIG. 2. The paper printout 6 may include the plurality of authorization codes 2, 3, 4, and 5. For example, the paper printout 6 may include a first wireless authorization code 2, a second wireless code 3, a third wireless code 4, and a fourth wireless code 5. Each of the authorization codes 2, 3, 4, and 5 may provide a predetermined amount of wireless service as described above. The aspect of paper printout 6 having a particular number of access codes is merely exemplary. The paper printout 6 can have any number of the authorization codes 2, 3, 4 and 5. For example the paper printout 6 may have two, three, four, five, six or more authorization codes.

FIG. 3 shows a web page having multiple wireless authorization codes according to the invention. The web page 7 shown in FIG. 3 may include a first wireless authorization code 2, a second wireless code 3, a third wireless code 4, and a fourth wireless code 5. Each of the authorization codes 2, 3, 4, and 5 may provide a predetermined amount of wireless service as described above. The aspect of the web page 7 having a particular number of authorization codes is merely exemplary. The web page 7 can have any number of the authorization codes 2, 3, 4 and 5. For example, the web page 7 may have two, three, four, five, six or more authorization codes. The web page 7 may be obtained by the wireless user through a wireless service provider website or the like.

After obtaining the multiple wireless authorization codes, the wireless user may then take the multiple wireless authorization codes and provide them to each of the multiple users that they wish to provide service. For example, a family member may purchase the multiple wireless authorization codes and provide them to one or more of their family members. Similarly, a business owner may purchase the multiple wireless authorization codes and provide them to one or more of their employees. In a similar approach, an organization may purchase the multiple wireless authorization codes and provide them to various members of the organization. Of course other implementations are contemplated and are within the spirit and scope of the invention as well. Accordingly, the multiple authorization codes provide a convenient and easy way for a single individual to provide wireless access for multiple users.

Additionally, the use of the multiple wireless authorization codes may be implemented in a family or shared wireless service plan. For example, the amount of airtime, amount of text messages, amount of data usage, and/or the like may be shared by all of the multiple users that are part of the family or shared wireless service plan associated with the multiple wireless authorization codes. Additionally, being part of a family or shared wireless plan may have additional benefits such as, for example, unlimited air time for calls made between shared users, unlimited text messages between shared users, unlimited data between shared users, and the like. Other benefits are contemplated as well for shared users.

Use of the multiple wireless authorization codes may automatically enroll the users of the multiple wireless authorization codes into the shared wireless service plan. On the other hand, a user may have to take steps in order to associate each of the multiple wireless users to be part of the shared wireless plan.

Figure 4:
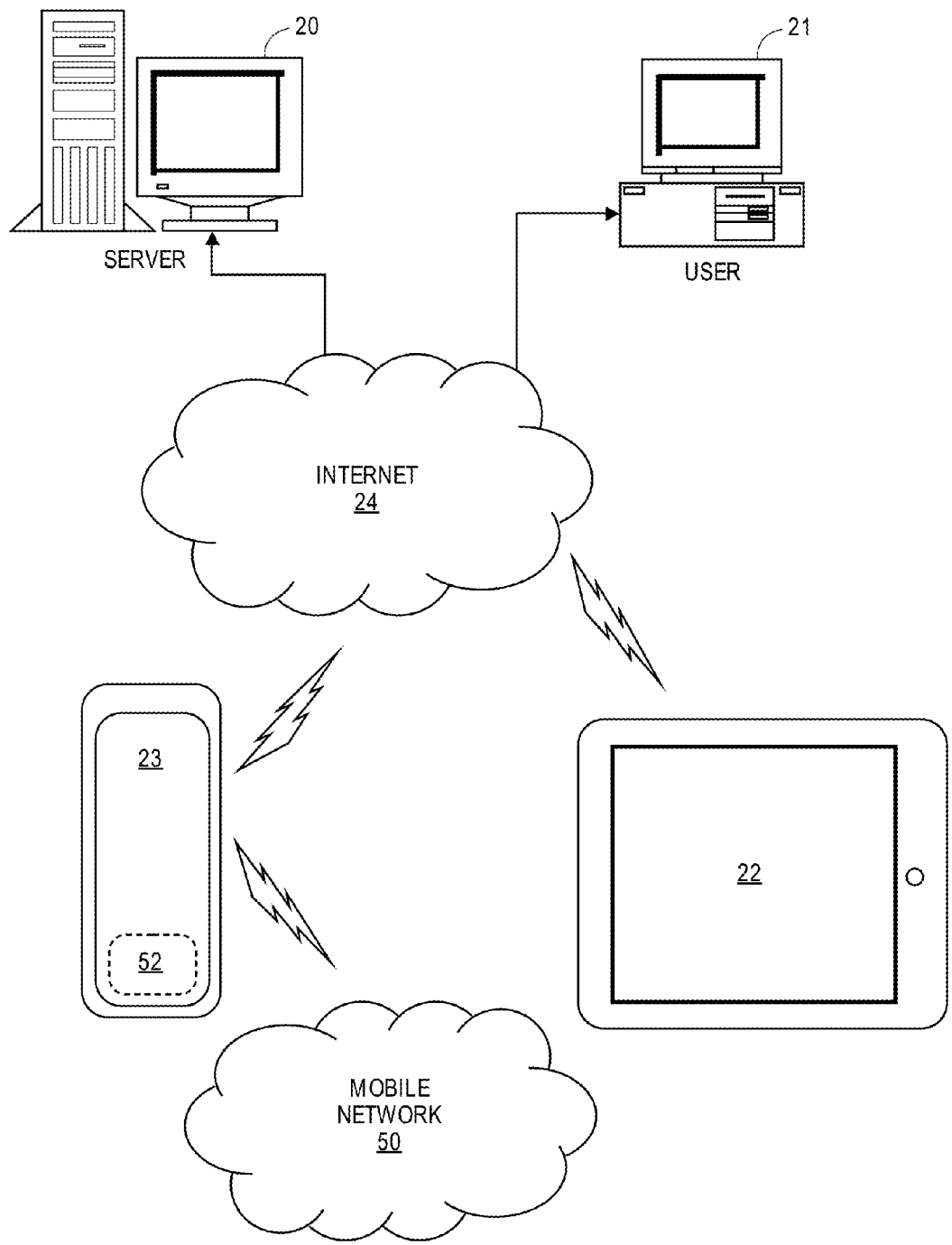
FIG. 4 illustrates a client-server arrangement in accordance with the invention.

FIG. 4 illustrates an arrangement of a client-server system in accordance with the invention. In one aspect, the system may be a website which implements a web-store that provides the multiple authorization codes card 1, the multiple authorization codes printout 6, and/or the multiple authorization codes web page 7. The system includes a server 20, a plurality of client devices 21, 22, 23, and a network connection 24. The server 20 communicates with the client devices 21, 22, 23, by employing the network connection 24. The network connection may be facilitated by an Internet connection. The user devices 21, 22, 23, may be personal communication devices that have web browsing capabilities. Examples of such devices include tablets 22, personal computers 21, PDAs, and mobile phones 23.

In operation, the server 20 may generate web pages that are provided to the user devices 21, 22, 23, in response to requests in the form of URL submissions. The web pages include static code pages as well as dynamic code pages, which are constructed based on user input and other system criteria. The web pages include controls which facilitate user data entry. Such controls include entry boxes, selection boxes, toggle buttons, drop down lists and the like. The user device operator can employ the device 21, 22, 23 to transmit web page data to the server. The structure and operation of the server 20 is discussed below.

Figure 5:
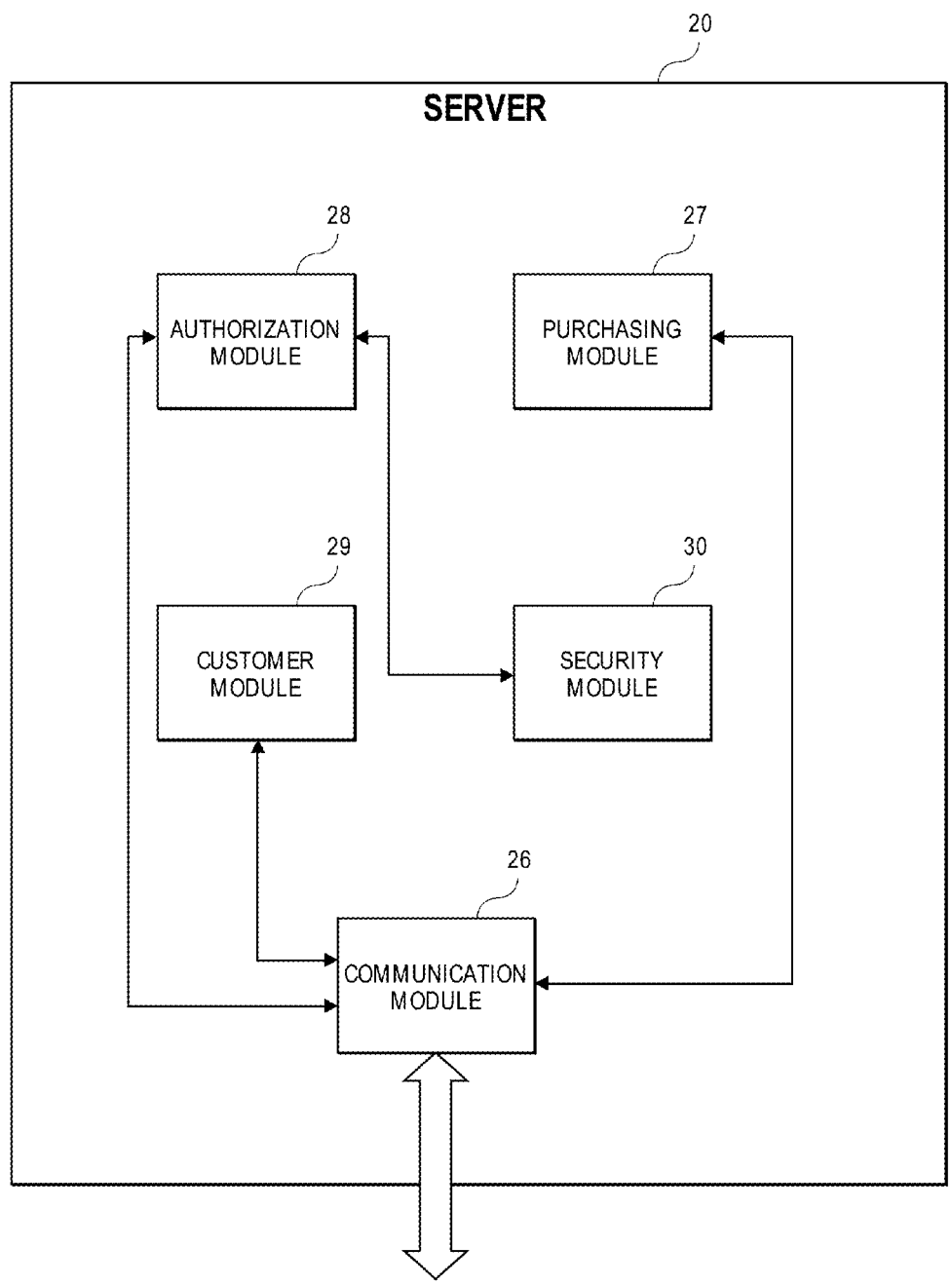
FIG. 5 illustrates the logical arrangement of a server in accordance with the invention.

FIG. 5 illustrates the structure of a server 20 of the invention. As may be appreciated by those skilled in the art, the illustrated structure is a logical structure and not a physical one. Accordingly, the illustrated modules can be implemented by employing various hardware and software components. In addition, two or more of the logical components can be implemented as a single module that provides functionality for both components. In one embodiment, the components are implemented as software program modules.

The server includes a communication module 26, a customer module 29, a security module 30, an authorization module 28, and a purchasing module 27. The communication module 26 may be coupled to the authorization module 28 to receive authorization codes which are used to authorize or activate wireless devices. The communication module 26 may also be coupled to the customer module 29 so as to retrieve customer account data, if available. In an alternate embodiment, the customer module 29 is not included in the server 20. The communication module 26 may also be coupled to the purchasing module 27 to execute payment transactions. For example, a credit card payment transaction is facilitated by employing the purchasing module 27.

The authorization module 28 may be further coupled to the security module 30, which generates authorization codes. The security module 30 provides functions and algorithms for generating activation codes. For example, in one embodiment, the activation codes for particular wireless devices may depend on the providing a wireless device information. Accordingly, the security module 30 stores such data corresponding to each wireless device. When activation codes for the wireless devices are requested, the security module 30 responds by transmitting the activation codes associated with the wireless devices.

In operation, the communication module 26 provides web pages to a user system in response to the web page requests. The communication module 26 responds to the web page requests by employing the various modules of the server 20. For example, in response to a request for a customer information page, the communication module 26 requests data from the customer module 29 so as to generate a dynamic web page, which is transmitted to the user system.

When the user requests to purchase multiple authorization codes, the communication module 26 transmits a purchase web page to the user system. The user employs controls within the received web page so as to enter payment data, including payment information. The user system transmits the resultant data to the communication module 26. The payment transaction may then be executed by the purchasing module 27, which provides a corresponding response to the communication module 26. The authorization codes may then be transmitted to the user system as a web page 7. In one embodiment, the authorization codes are transmitted over a secure connection such as secure socket layer (SSL) or the like. Alternatively the authorization codes 2, 3, 4, 5 may be provided to the user on a card 1 (via mail, by retail merchant, or the like). Alternatively the authorization codes 2, 3, 4, 5 may be provided to a user and printed on a paper printout 6 (via mail, by retail merchant, internet-enabled computer or the like).

Figure 6:
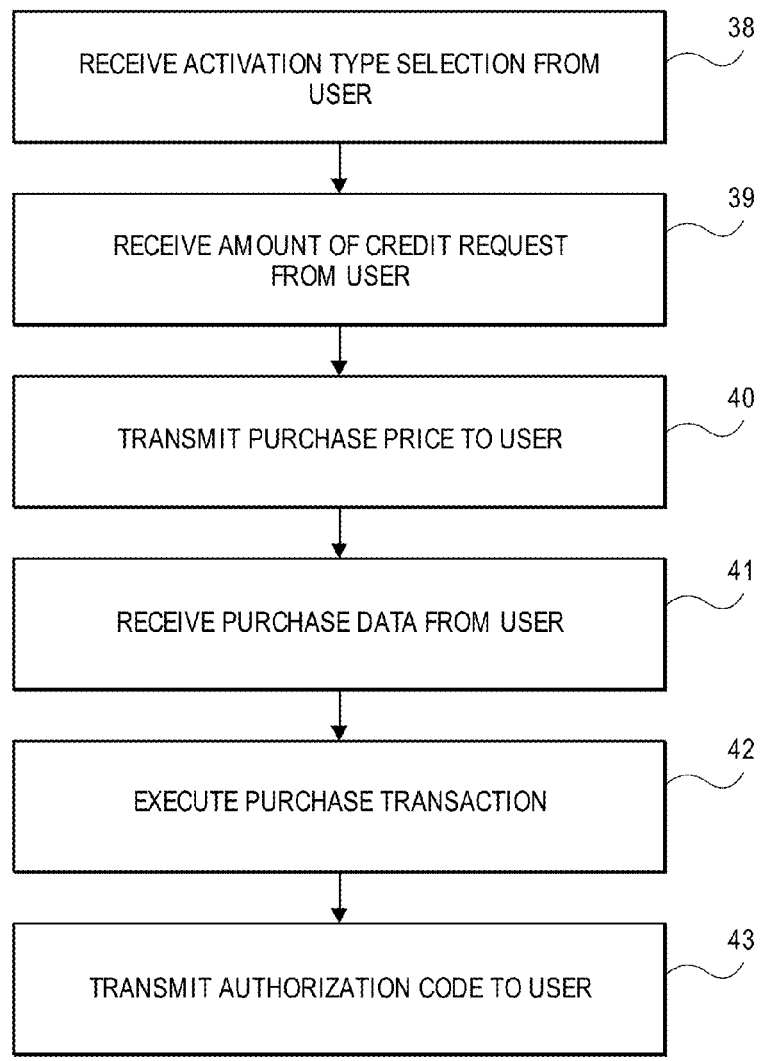
FIG. 6 is a flow diagram illustrating the operation of the server when facilitating a purchase of prepaid wireless services.

FIG. 6 illustrates the operation of the server 20 when the user selects to purchase activation codes from the provider. The user first connects to the provider website by submitting the provider website URL in the user browser application. The user then selects to purchase authorization codes from a start web-page. The user is provided with a second web-page that requests an activation type selection. For example, the user may wish to activate local calling functionality only. Additionally, the user may wish to activate roaming functionality. Accordingly, the user can select the desired activation from the controls provided by the webpage (step 38). In addition, the user is prompted to enter an amount of service credit, number of authorization codes or the like in an entry box of the page.

The server 20 receives the user data (step 39) and provides a web-page to the user system that includes a payment indication for the requested authorization (step 40). The user is provided with controls which allow for the selection and entry of payment data. For example, the user selects a credit card type and enters a credit card number with a corresponding expiration date. The server 20 receives the payment data from the user and transmits the data to the purchasing module 27 (step 41). The purchasing module 27 processes the data according to the selected payment type (step 42). If the payment transaction is successful, the purchasing module 27 transmits a corresponding signal to the communication module 26. The communication module 26 requests authorization codes from the authorization module 28. At this time, the user may be required to provide a unit identification so as to enable the server 20 to select proper authorization codes. In another embodiment, the server provides an authorization code regardless of the unit identification. The authorization module 28 employs the security module 30 to identify authorization codes for the user request, as discussed above. The authorization codes are then transmitted to the user system, preferably as part of a web-page (step 43). The authorization codes are advantageously provided over a secure connection.

Referring back to FIG. 4, the user may then use the authorization codes to add service, activate service, and/or authorize service for one or more wireless devices. For example, a user can enter one of the authorization codes into the wireless device 23 of FIG. 4. The wireless device 23 may transmit the authorization code to the Internet 24, to a mobile network 50 or the like. The transmitted authorization code may be verified by the server 20, a server provisioning wireless service to the user, or the like. Additionally, the server 20, the server provisioning wireless server to the user, or the like may respond to the user indicating that the code has been verified, service has been added, service has been authorized, service has been activated or the like.

Additionally, the wireless device 23 may include an application, memory, or the like (hereinafter application 52) that is configured to implement the authorization code transmission process. For example, the application 52 may be a so called pre-paid engine. The application 52 may also receive a response from the server 20, the server provisioning wireless server to the user, or the like indicating that the code has been verified, service has been added, service has been authorized, service has been activated or the like. The application 52 may also be configured to control use of the wireless device 23 based on interaction with the server 20, the server provisioning wireless server to the user, or the like.

The application 52 may utilize an internal accounting module to establish an account with a representation of prepaid funds or available credit. The internal accounting module may also store a plurality of charge rates and may also store a billing algorithm, which can classify each telephone call into one of a plurality of billing categories; select a charge rate corresponding to that billing category; calculate an appropriate charge for that telephone call in real time by using the selected charge rate; and apply this appropriate charge to the account. In this aspect, the application 52 may also include a module for one or more system provider host processors, which store mobile telephone unit identification information; store operating codes needed for mobile phone unit activation; and store operating codes needed for setting prepaid funds or available credit amounts in mobile phone unit accounts whereby, upon receipt of mobile telephone unit identification information from a particular mobile phone unit or its user, the host processor may be capable of ascertaining the operating codes needed to activate that particular mobile phone unit or needed to set its account amount. Further details of this aspect of the application 52 are described in U.S. Pat. No. 6,650,887, to McGregor, et al., filed Nov. 18, 2003 and incorporated by reference herein in its entirety.

Alternatively, the application 52 may include a metering client that may be implemented as a process capable of tracking usage of a wireless device in a wireless network with a metering system implemented in a network operator cloud and a tracking system implemented in a wireless device. The metering client may be capable of activating the wireless device in response to identification of the wireless device and confirmation of use of a tracking system to the metering system. The metering client may be further configured to obtain by the metering system, an amount of wireless services used by the wireless device; wherein the obtaining includes at least one of obtaining an amount of wireless services used from the third party wireless network and obtaining an amount of wireless services used from the tracking system. Further details of this aspect of the metering client are described in U.S. patent application Ser. No. 13/669,838, filed Nov. 6, 2012 and incorporated by reference herein in its entirety.

In an alternative embodiment, the authorization codes may be transmitted over the cellular communication link to the wireless device 23 without the need for the user to manually enter a code. In this regard, purchasing the multiple authorization codes, as described above, also includes transmission of the codes to one or more wireless devices 23. Similarly, purchasing multiple authorization codes may simply signal the mobile network 50 or the application 52 to add, activate, authorize or the like wireless service to the wireless device 23.

Alternatively, if a plurality of wireless devices 23 are associated with a single account, a multiple user plan, a family plan, or the like, then utilizing one of the plurality of authorization codes 2, 3, 4, 5 may function to deliver the remaining authorization codes 2, 3, 4, 5 to the other wireless devices 23. More specifically, if a designated user enters one of the plurality of authorization 2, 3, 4, 5 into a wireless device 23, into a webpage 7, or the like, this may initiate delivery of the remaining authorization codes 2, 3, 4, 5 via SMS text message, delivered wirelessly to the application 52, or the like to the remaining associated wireless devices 23.

In an alternative embodiment, a user can enter one of the authorization codes into the personal computer 21 or tablet computer 22 of FIG. 4. The personal computer 21 or tablet computer 22 may transmit the authorization code to the Internet 24, or the like. The transmitted authorization code may be verified by the server 20, a server provisioning wireless service to the user, or the like. Additionally, the server 20, the server provisioning wireless server to the user, or the like may respond to the user indicating that the code has been verified, service has been added, service has been authorized, service has been activated or the like. The application 52 may also receive a response from the server 20, the server provisioning wireless server to the user, or the like indicating that the code has been verified, service has been added, service has been authorized, service has been activated or the like. The application 52 may also be configured to control use of the wireless device 23 based on interaction with the server 20, the server provisioning wireless server to the user, or the like.

In yet another embodiment, where the credit level for a user is stored within the system, the user does not receive an authorization code but is able to use the service for each of the users they want to provide service shortly after making the purchase.

Although the invention was discussed in terms of certain preferred embodiments, the description is not limited to such embodiments. Rather, the invention includes other embodiments including those apparent to a person of ordinary skill in the art. Thus, the scope of the invention should not be limited by the preceding description but should be ascertained by reference to the claims that follow.

For the purposes of this disclosure a computer readable medium stores computer data, which data can include computer program code that is executable by a processor of the server, PC, SIM or mobile device, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO) and/or the like, and/or a combination of two or more thereof.

In an embodiment, the invention may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Further in accordance with various aspects of the invention, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

In an embodiment, the invention may be web-based. For example, a server may operate a web application to allow the invention to operate in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™ Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A system for adding, authorizing, or activating pre-paid wireless service for multiple users comprising:
   a server comprising a processor and a network connection, the processor implementing a plurality of modules;
   the server configured to receive one of a plurality of authorization codes associated with one of a single transaction, single authorization card, and a single account, and wherein each of the plurality of codes is associated with a separate predetermined amount of wireless service;
   the server further configured to verify that the received one of the plurality of authorization codes is authentic;
   the server further configured to at least one of add, authorize, and activate wireless service for a wireless device in response to receiving and verifying the received one of the plurality of authorization codes; and
the server is further configured to transmit the remaining plurality of authorization codes to other wireless devices associated with the wireless device after the server receives one of the plurality of authorization codes for the wireless device,
wherein the server is configured to receive one of the plurality of authorization codes associated with the single transaction, wherein the single transaction comprises one of a retail transaction and web-based transaction; and
wherein the single transaction results in generation of the plurality of authorization codes; and
wherein the wireless device comprises an accounting module.

2. The system according to claim 1 wherein the single transaction comprises the retail transaction and the retail transaction results in generation of the plurality of authorization codes.

3. The system according to claim 1 wherein the single transaction comprises the web-based transaction and the web-based transaction results in generation of the plurality of authorization codes.

4. The system according to claim 3, comprising:
a web server comprising a processor and a network connection, the processor implementing a plurality of modules;
the web server configured to provide a first web page to a user including at least an interface for entering information;
the web server further configured to provide an interface on said first web page for purchasing wireless service for multiple wireless device users;
the web server configured to receive a request with for the purchase of wireless service, the request including financial transaction data for purchasing wireless service; and
the web server configured to transmit the plurality of authorization codes in response to the purchase of wireless service by employing a second web page including the plurality of authorization codes corresponding to the wireless service purchased.

5. The system according to claim 1 wherein the server is configured to receive one of the plurality of authorization codes associated with the single authorization card, wherein the single authorization card comprises the plurality of authorization codes.

6. The system according to claim 1 wherein the server is configured to receive one of the plurality of authorization codes associated with the single account.

7. The system according to claim 1 wherein the accounting module tracks wireless service including remaining available wireless service.

8. The system according to claim 1 wherein the server is further configured to enroll each wireless device utilizing one of the plurality of authorization codes into a family plan.

9. The system according to claim 1 wherein after the server receives one of the plurality of authorization codes for the wireless device, the server is further configured to at least one of add, authorize and activate wireless service based on the remaining plurality of authorization codes for the other wireless devices associated with the wireless device.

10. A method for adding, authorizing, or activating prepaid wireless service for multiple users comprising:
implementing a server comprising a processor and a network connection, the processor implementing a plurality of modules;
receiving by the server one of a plurality of authorization codes associated with a single transaction, single authorization card, or a single account, and wherein each of the plurality of codes is associated with a separate predetermined amount of wireless service;
verifying that the received one of the plurality of authorization codes is authentic with the server;
at least one of adding, authorizing, and activating wireless service for a wireless device in response to receiving and verifying the one of the plurality of authorization codes by the server; and
transmitting, from the server, the remaining plurality of authorization codes to other wireless devices associated with the wireless device after the server receives one of the plurality of authorization codes for the wireless device,
wherein the receiving comprises receiving one of the plurality of authorization codes associated with the single transaction, wherein the single transaction comprises one of a retail transaction and web-based transaction; and
wherein the single transaction results in generation of the plurality of authorization codes; and
wherein the wireless device comprises an accounting module.

11. The method according to claim 10 wherein the single transaction comprises the retail transaction and the retail transaction results in generation of the plurality of authorization codes.

12. The method according to claim 10 wherein the single transaction comprises the web-based transaction and the web-based transaction results in generation of the plurality of authorization codes.

13. The method according to claim 12, comprising:
providing a server system comprising a processor and a network connection, the processor implementing a plurality of modules;
providing a first web page with the server system to a user of the wireless service, the first web page including at least an interface for entering information;
providing an interface with the server system on said first web page for purchasing additional airtime for multiple wireless device users;
receiving a request with the server system for the purchase of additional wireless service, the request including financial transaction data for purchasing additional airtime; and
transmitting with the server system the plurality of authorization codes in response to the purchase of additional wireless service by employing a second web page including the plurality of authorization codes corresponding to the wireless service purchased.

14. The method according to claim 10 wherein the receiving comprises receiving one of the plurality of authorization codes associated with the single authorization card, wherein the single authorization card comprises the plurality of authorization codes.

15. The method according to claim 10 wherein the receiving comprises receiving one of the plurality of authorization codes associated with the single account.

16. The method according to claim 10 wherein the accounting module tracks wireless service including remaining available wireless service.

17. The method according to claim 10 further comprising enrolling each wireless device utilizing one of the plurality of authorization codes into a family plan by the server.

18. The method according to claim 10 wherein after the receiving one of the plurality of authorization codes for the wireless device, adding, authorizing, and activating wireless service, by the server, based on the remaining plurality of authorization codes for the other wireless devices associated with the wireless device.

19. A system for adding, authorizing, or activating pre-paid wireless service for multiple users comprising:
- a server comprising a processor and a network connection, the processor implementing a plurality of modules;
- the server configured to receive one of a plurality of authorization codes associated with one of a single transaction, single authorization card, and a single account, and wherein each of the plurality of codes is associated with a separate predetermined amount of wireless service;
- the server further configured to verify that the received one of the plurality of authorization codes is authentic;
- the server further configured to at least one of add, authorize, and activate wireless service for a wireless device in response to receiving and verifying the received one of the plurality of authorization codes;
- the server is further configured to transmit the remaining plurality of authorization codes to other wireless devices associated with the wireless device after the server receives one of the plurality of authorization codes for the wireless device; and
- a metering system implemented in a network operator cloud, the metering system configured to meter the pre-paid wireless service for the multiple users,
- wherein the server is configured to receive one of the plurality of authorization codes associated with the single transaction, wherein the single transaction comprises one of a retail transaction and web-based transaction; and
- wherein the single transaction results in generation of the plurality of authorization codes.

20. The system according to claim 19 wherein the single transaction comprises the retail transaction and the retail transaction results in generation of the plurality of authorization codes.

\* \* \* \* \*